United States Patent
Grant, Jr. et al.

(10) Patent No.: US 9,658,047 B2
(45) Date of Patent: May 23, 2017

(54) COMPONENT MEASUREMENT SYSTEM HAVING WAVELENGTH FILTERING

(71) Applicant: Caterpillar Inc., Peoria, IL (US)

(72) Inventors: Marion Billingsley Grant, Jr., Princeville, IL (US); Richard Griffith Marsh, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/521,867

(22) Filed: Oct. 23, 2014

(65) Prior Publication Data

US 2016/0116268 A1 Apr. 28, 2016

(51) Int. Cl.
*G01S 17/66* (2006.01)
*G01S 7/497* (2006.01)
*A61B 5/0205* (2006.01)
*G01Q 20/00* (2010.01)
*G01B 5/008* (2006.01)
*G01B 5/20* (2006.01)

(52) U.S. Cl.
CPC .............. *G01B 5/008* (2013.01); *G01B 5/202* (2013.01)

(58) Field of Classification Search
CPC ....... C12Q 1/6837; G01S 17/66; G01S 17/42; G01S 17/89; G01S 7/497; G01S 7/4972; G01B 11/002; G01B 5/008; G01B 11/14; G01B 11/005; A61B 5/0205; G01Q 20/00
USPC ......................................................... 324/72
See application file for complete search history.

(56) References Cited

U.S. PATENT DOCUMENTS

| | | | |
|---|---|---|---|
| 3,795,132 A | 3/1974 | Huling et al. | |
| 4,901,256 A * | 2/1990 | McMurtry | G01B 7/28 33/503 |
| 5,583,443 A | 12/1996 | McMurtry et al. | |
| 6,266,371 B1 * | 7/2001 | Kondo | G06T 7/2026 348/699 |
| 7,239,050 B2 | 7/2007 | Miyamoto | |
| 7,464,481 B2 | 12/2008 | Ishikawa | |
| 7,715,999 B2 | 5/2010 | Kiyotani | |
| 2003/0184761 A1 * | 10/2003 | Degertekin | G01B 11/026 356/511 |
| 2006/0219678 A1 * | 10/2006 | Sopori | G01B 11/06 219/121.72 |
| 2010/0064396 A1 * | 3/2010 | Nakata | G01Q 60/18 850/30 |

(Continued)

FOREIGN PATENT DOCUMENTS

| | | |
|---|---|---|
| DE | 20204832 U1 | 7/2002 |
| DE | 102006015627 B4 | 3/2008 |

OTHER PUBLICATIONS

"Gear Highlights GMX Machine Series" by Jürgen Amslinger, Mahr GmbH, Göttingen, Sep. 2014, pp. 1-24.

(Continued)

*Primary Examiner* — Son Le
*Assistant Examiner* — Akm Zakaria
(74) *Attorney, Agent, or Firm* — Finnegan, Henderson, Farabow, Garrett & Dunner, LLP

(57) ABSTRACT

A system is disclosed for use in measuring a component. The system may have a probe configured to generate signals associated with a proximity to actual target points of the component, an actuator configured to move the probe relative to the component, and a controller in communication with the probe and the actuator. The controller may be configured to receive coordinates of intended form target points, to determine coordinates of the actual target points of the component relative to a component datum based on the signals, and to make a comparison of the coordinates of the intended form target points and the coordinates of the actual target points. The controller may also be configured to generate a deviation report based on the comparison, and to filter information from the deviation report according to wavelength into a plurality of deviation categories corresponding to component specification requirements of the component.

9 Claims, 3 Drawing Sheets

(56) References Cited

U.S. PATENT DOCUMENTS

| | | | |
|---|---|---|---|
| 2011/0266483 A1* | 11/2011 | Xu | F16J 15/04 |
| | | | 251/315.1 |
| 2013/0185948 A1 | 7/2013 | Racine | |
| 2014/0059872 A1 | 3/2014 | Nakagawa et al. | |
| 2014/0125990 A1* | 5/2014 | Hinderling | G02B 5/284 |
| | | | 356/496 |

OTHER PUBLICATIONS

"Hommel-Etamic roundscan Fast, accurate form and roughness measurement". Brochure [online]. Jenoptik AG, Dec. 2011 [retrieved on Aug. 2016]. Retrieved from the Internet: <URL: https://www.jenoptik.com/cms/jenoptik.nsf/res/roundcsan_EN_10044872.pdf/$file/roundcsan_EN_10044872.pdf.

Specification of Surface Texture, VDA 2005 [English Translation]. VDA Recommendation. Feb. 2007. Dokumentation Kraftfahrwesen E.V. (DKF) Ulrichstrasse 14, D-74321 Bietigheim-Bissingen. Verband Der Automobilindustrie E.V. (VDA) Westendstrasse 61, 60325 Frankfurt.

Specification of Surface Texture, Brief Version, VDA 2005, Appendix 1 [English Translation]. VDA Recommendation. Jul. 2002. Dokumentation Kraftfahrwesen E.V. (DKF) Ulrichstrasse 14, D-74321 Bietigheim-Bissingen. Verband Der Automobilindustrie E.V. (VDA) Westendstrasse 61, 60325 Frankfurt.

"OmniSurf—A Comprehensive Surface Profile Analysis Package", Digital Metrology Solutions, Inc., www.digitalmetrology.com, downloaded on Aug. 10, 2007.

* cited by examiner

COMPONENT MEASUREMENT SYSTEM HAVING WAVELENGTH FILTERING

TECHNICAL FIELD

The present disclosure relates generally to a measurement system and, more particularly, to a component measurement system having wavelength filtering.

BACKGROUND

Some manufacturers utilize measurement systems (e.g., coordinate measuring machines—CMM, also known as gear checkers) during component fabrication to determine if a component is fabricated to required specifications, within allowable tolerances. If dimensions of the component are determined to match the required specifications, the component is considered acceptable and can be used for its intended purpose. Otherwise the component is rejected and discarded, or reworked until the dimensions of the component fall within the allowable tolerances. An example of such a measurement system is disclosed in U.S. Pat. No. 7,715,999 that issued to Kiyotani on May 11, 2010.

The specifications for a particular component may include requirements for form, requirements for waviness, and requirements for roughness. And it may be possible for a manufactured component to fall within allowed tolerances for one or more of these requirements but not for all of the requirements. Unfortunately, most measurement systems provide only a general deviation report listing overall dimensions of the component. And it can be difficult in some situations to determine, based on the deviation report alone, whether the component is fabricated according to each requirement of the specifications. It can be even more difficult to determine what action needs to be taken to improve the associated manufacturing process so that a higher percentage of fabricated parts are acceptable.

The disclosed measurement system is directed to overcoming one or more of the problems set forth above and/or other problems of the prior art.

SUMMARY

In one aspect, the present disclosure is directed to a system for measuring a component. The system may include a probe configured to generate signals associated with a proximity to actual target points of the component, an actuator configured to move the probe relative to the component, and a controller in communication with the probe and the actuator. The controller may be configured to receive coordinates of intended form target points, to determine coordinates of the actual target points of the component relative to a component datum based on the signals, and to make a comparison of the coordinates of the intended form target points and the coordinates of the actual target points. The controller may also be configured to generate a deviation report based on the comparison, and to filter information from the deviation report according to wavelength into a plurality of deviation categories corresponding to component specification requirements of the component.

In another aspect, the present disclosure is directed to another system for measuring a component. This system may include a probe configured to generate signals associated with a proximity to actual target points of the component, an actuator configured to move the probe relative to the component, and a controller in communication with the probe and the actuator. The controller may be configured to receive coordinates of intended form target points, to determine coordinates of the actual target points of the component relative to a component datum based on the signals, and to determine a difference between the coordinates of the intended form target points and the coordinates of the actual target points. The controller may also be configured to generate a deviation report based on the difference, and to filter information from the deviation report according to wavelength into a form error category, a waviness category, and a roughness category corresponding to component specification requirements of the component. Deviations in the form error category may have greater wavelengths than deviations in the waviness and roughness categories. Deviations in the waviness category may have greater wavelengths than deviations in the roughness category.

In another aspect, the present disclosure is directed to a method of measuring a component assembly. The method may include moving a probe into proximity of a target point on the component, and measuring an actual location of the target point relative to at least one component datum. The method may further include receiving a perfect form location of the target point, and making a comparison of the actual location and the perfect form location. The method may also include generating a deviation report based on the comparison, and filtering information from the deviation report according to wavelength into a plurality of deviation categories corresponding to specification requirements of the component.

DETAILED DESCRIPTION

Figure 1:
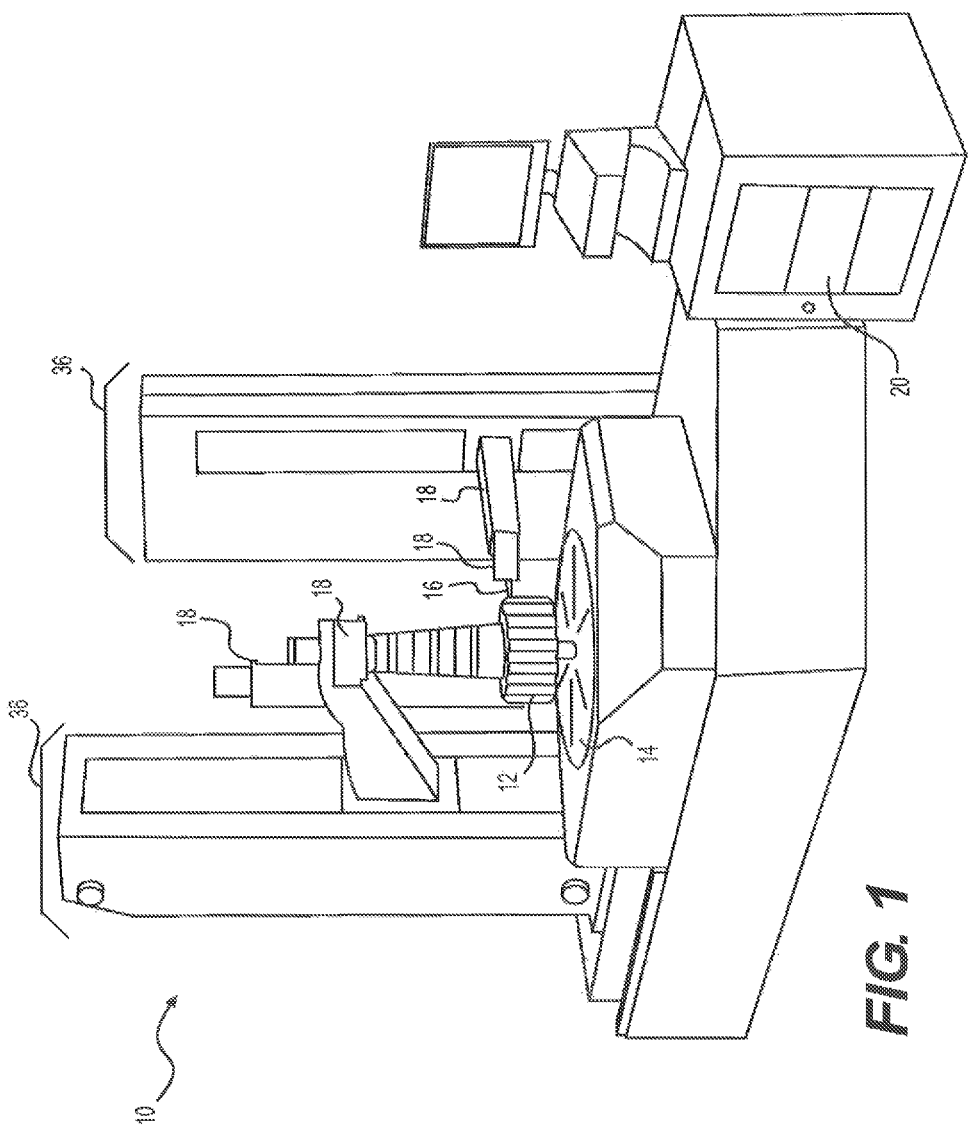
FIG. 1 is a schematic illustration of an exemplary disclosed measurement system.

FIG. 1 illustrates an exemplary measurement system (system) 10. System 10 may be used to measure surfaces of different components 12 fabricated via a wide range of processes. These processes may include, for example, casting, cutting, deburring, drilling, forging, lathing, milling, welding, and other similar processes. In the disclosed embodiment, component 12 is a gear fabricated through forging and cutting processes, and measurement system 10 may be used as a gear checker to measure particular surfaces (e.g., bores, flange faces, gear teeth involutes, etc.) of component 12 after the fabrication processes are complete. Based on output from measurement system 10, component 12 may be considered acceptable for use, or rejected. And measurements of the rejected components may be used to adjust the forging and/or cutting processes that produced the components. System 10 may include, among other things, a work surface 14 upon which component 12 rests during measuring, a probe 16 that performs the measurements, at least one actuator 18 operably connected to probe 16, and a controller 20 in communication with probe 16 and actuator 18.

Work surface 14 may include any support structure that adequately holds component 12 during measurement of component 12 by probe 16. In one embodiment, work surface 14 is a table or frame configured to support component 12 from an underside. In another embodiment, work surface 14 is a rack, a spindle, or other mount that suspends component 12 at a desired location above the ground. It is contemplated that work surface 14 may include any number and type of devices for securing component 12 in place, for example mechanical and/or magnetic clamps (not shown). Work surface 14 may be stationary or movable, as desired.

Probe 16 may be a mechanical type of probe, an electrical type of probe, an optical type of probe, a lighted type of probe (e.g., a laser or white light probe), or another known type of probe that is used to generate signals corresponding to an actual location of particular surface points (a.k.a., target points) on component 12. A mechanical or electrical type of probe 16 may be brought into physical contact with the target points, while an optical or lighted type of probe 16 may only be brought near the target points. In either case, sensors (not shown) associated with probe 16 may detect a desired degree of engagement (e.g., a pressure or electrical contact) and/or a desired proximity to the target points, and responsively generate contact signals. The contact signals may then be correlated by controller 20 to a 3-dimensional location of probe 16 at the time of engagement, relative to known coordinate axes of system 10 and/or datums defined by features of component 12. In the disclosed embodiment, probe 16 is a round mechanical probe having a radius of about 0.8 mm or smaller, and probe 16 is moved across surfaces of component 12 with a data point spacing of about 0.1 mm or less. In this example, the engagement of the spherical probe with the surfaces of component 12 results in signal generation used to represent actual positions of the target points of component 12 in an X, Y, Z coordinate system.

Figure 2:
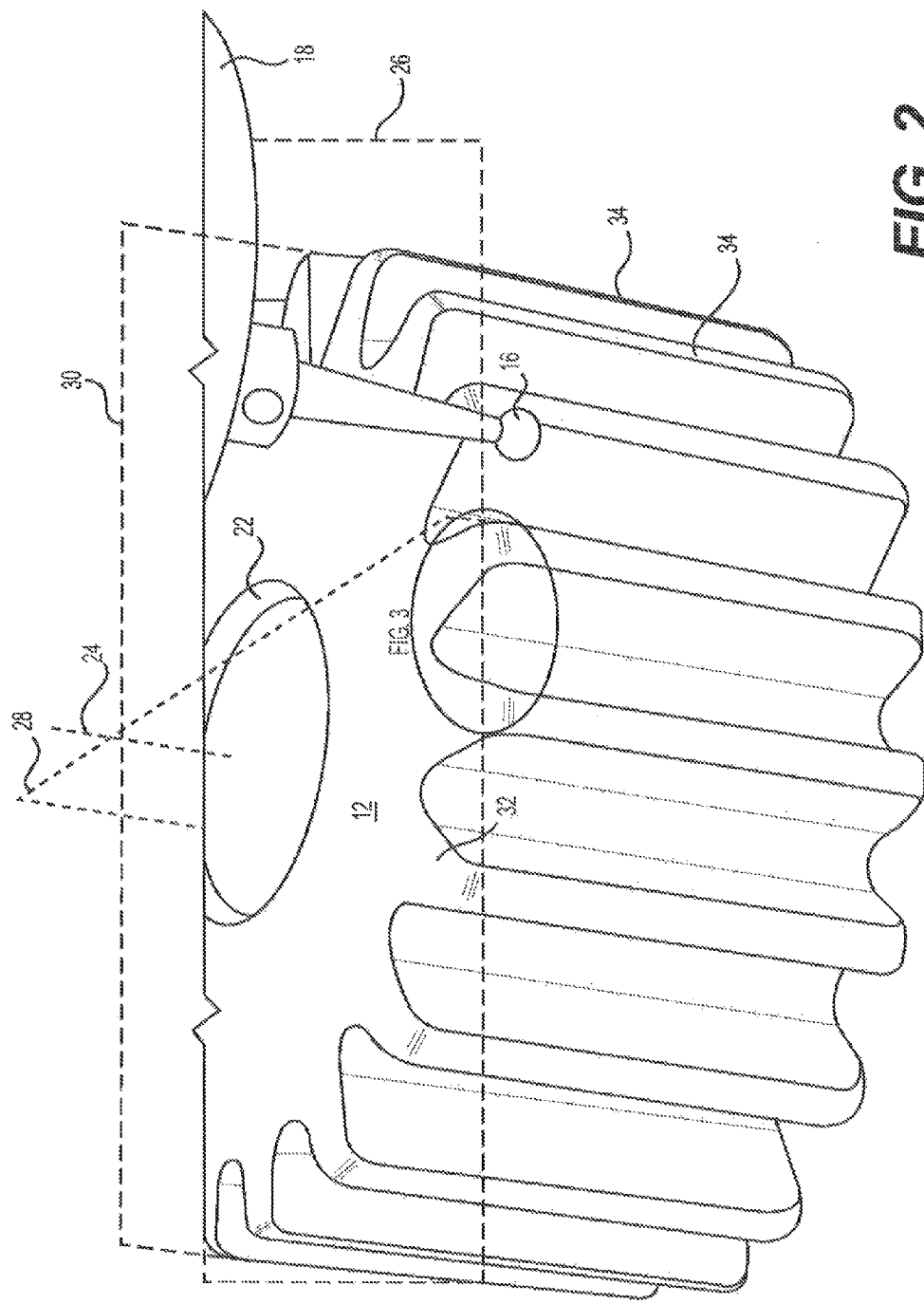
FIG. 2 is an exemplary disclosed portion of the measurement system of FIG. 1.

Component 12 may include one or more features defined as datums for use by measurement system 10 in locating and/or measuring component 12. For example, in the embodiment of FIG. 2, component 12 includes a central bore (bore) 22, and an axis 24 of bore 22 may be used as a datum. Additionally or alternatively, one or more planes 26, 28, 30 passing through axis 24 may be also be defined as datums. In this example, planes 26, 28, and 30 may be orthogonal to each other, and plane 26 may generally correspond with (i.e., be co-planar with) an outer face 32 of component 12. Some of the target points scanned using probe 16 may lie along an involute edge profile of gear teeth 34 located at outer face 32.

Actuators 18 (referring to FIGS. 1 and 2) may include any type of device used to move probe 16 to any target point on component 12. For example, actuators 18 may include electric motors, hydraulic motors, cylinders, pistons, piezos, solenoids, etc. Based on command signals from controller 20, actuators 18 may move probe 16 by a desired amount, in a desired direction, to a desired position, and/or into a desired orientation. And controller 20 may track this movement to calculate the resulting position of probe 16 relative to the coordinate system and/or relative to the datums of component 12 at the time of engagement or desired proximity with the target points.

In some embodiments, work surface 14, probe 16, and/or actuators 18 may be mounted on or otherwise connected to each other via a gantry 36 (shown only in FIG. 1). Gantry 36 may include, among other things, arms, bearings, belts, bridges, carriages, chains, guides, legs, rails, spindles, tracks, etc. that allow relative movement in one or more dimensions. In some embodiments, gantry 36 is connected to or forms a portion of work surface 14. In other embodiments, gantry 36 rests on or resides near work surface 14, but is not directly connected to work surface 14.

Controller 20 may be in communication with probe 16 and/or actuators 18 to control the placement of probe 16 and to generate the coordinate signals based on engagement or desired proximity of probe 16 with the target points of component 12. Controller 20 may embody a single or multiple microprocessors, field programmable gate arrays (FPGAs), digital signal processors (DSPs), etc. that include a means for controlling an operation of system 10. If multiple microprocessors are utilized, the different microprocessors may communicate with each other and/or with a master controller, if desired, to accomplish the disclosed functions. For example, a dedicated microprocessor may be associated with movement of probe 16, while another microprocessor may be associated with generation of the coordinate signals. Still another microprocessor may be associated with processing of the signals and/or generation of corresponding reports. Numerous commercially available microprocessors can be configured to perform the functions of controller 20. Various known circuits may be associated with controller 20, including power supply circuitry, signal-conditioning circuitry, actuator driver circuitry, communication circuitry, and other appropriate circuitry.

After generation of the coordinate signals, controller 20 may process the signals to create a variety of output. The output may include, for example, a dimension report, a deviation report, a form error report, a waviness report, and a roughness report. The dimension report may include raw data corresponding to the coordinates of probe 16 at each target point of component 12. The deviation report may include processed data representing a difference between the measured or actual coordinates of the target points and expected target point coordinates of a design intent or perfect form component 12. For the purposes of this disclosure, the term "perfect form component" may be defined as a component having exact intended dimensions, not including tolerances. The deviation report may then be broken down into deviations of different wavelengths, and the deviations classified into ranges of deviation wavelengths that correspond with form error, waviness, and roughness. Reports may then be generated for each of these ranges. These reports may take the form of numerical spreadsheet data, data plots, line graphs, etc. The values of the wavelength boundaries (i.e., the threshold wavelengths bounding the different ranges of wavelengths) used to generate each of these reports may be customized by the operator, if desired.

Figure 3:
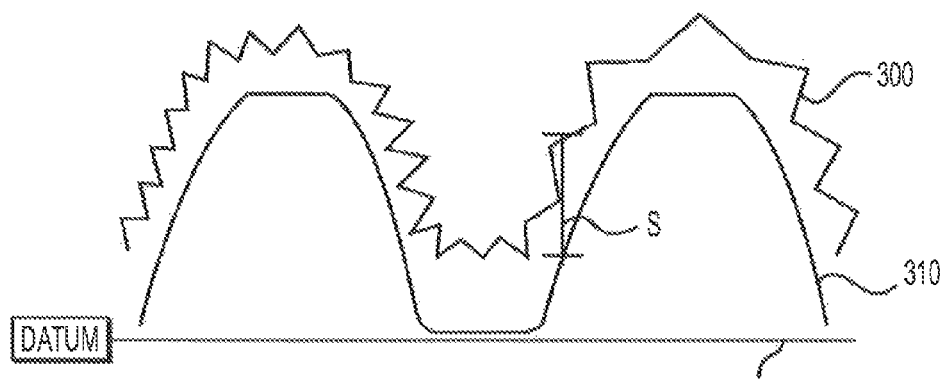
FIGS. 3-6 are exemplary reports that may be generated by the measurement system of FIG. 1.

FIG. 3 shows a first curve 300 representing the raw data collected by controller 20 as probe 16 moves about and engages the target points of component 12. The raw data may correspond with the coordinate locations of the target points relative to one or more of datums 24-30. As discussed above, the dimension report may be collection of this raw data. In addition, FIG. 3 also shows a second curve 310 representing the design intent or perfect form of component 12. A difference between the actual locations of the target points and the intended locations of the target points (e.g., the spacing S between curves 300 and 310) may correspond with a deviation between actual surfaces of component 12 at the target points and virtual surfaces of the design intent or perfect form of component 12. The deviation report discussed above may be collection of data representing these deviations, the data being calculated by controller 20 as a subtraction function from the two sets of coordinates.

While the deviation report itself may be of some use, knowing the makeup of the deviations may be more helpful in determining if the produced component is acceptable for its intended use and/or for determining the cause and solution of individual types of deviations. Accordingly, controller 20 may be configured to break down curve 300 into multiple different curves, each representing different wavelengths of deviations. For the purposes of this disclosure, a deviation wavelength may be defined as a distance in any one direction (e.g., in the X-direction, the Y-direction, or the Z-direction) between successive high or low extremes of target point coordinate deviation values, as measured by probe 16.

Figure 4:
Figure 5:
Figure 6:
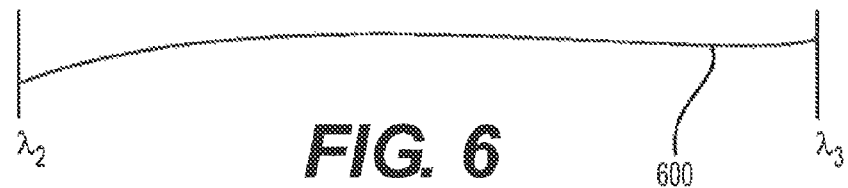

The process of breaking down curve 300 into the different deviation types is illustrated in FIGS. 4-6. For example a first range of deviations having a wavelength of $0$-$\lambda_1$ (shown by a curve 400 in FIG. 4) may correspond with a surface roughness of component 12. A second range of deviations having a wavelength of $\lambda_1$-$\lambda_2$ (shown by a curve 500 in FIG. 5) may correspond with a waviness of component 12. A third range of deviations having a wavelength of $\lambda_2$-$\lambda_3$ (shown by a curve 600 in FIG. 6) may correspond with a four error. Curves 400-600 may be compounded (e.g., added together) to make curve 300. As will be explained in more detail in the following section, controller 20 may be configured to filter the data contained in the deviation report according to wavelength range, and to generate separate reports associated with each of the different ranges.

INDUSTRIAL APPLICABILITY

The disclosed measurement system may be utilized to determine deviations of a fabricated component from a design intent or perfect form component. In particular, the disclosed measurement system may be configured to measure the fabricated component relative to component datums, and to generate corresponding reports associated with two or more of form error, waviness, and roughness. This level of deviation detail may then be used to accept the component for its intended use or to reject the component. In addition, the level of detail provided by the disclosed measurement system may facilitate diagnosis of rejected components, and adjustment to the associated fabrication processes that reduces the frequency of the components being rejected. Operation of measurement system 10 will now be described.

The disclosed measurement system may be activated after a component 12 has been loaded onto work surface 14. Component 12 may be automatically or manually placed onto work surface 14, and clamped in place using any methodology known in the art. Information corresponding to the intended or perfect form of component 12 may then be loaded into controller 20, along with definitions (e.g., type, orientation, and/or location) relative to at least one component datum. This information may be loaded into controller 20 by an operator of system 10.

Thereafter, probe 16 may be energized to detect the pre-defined component datums and to begin measuring the locations of target points on component 12 with respect to one or more of the datums. For example, controller 20 may selectively energize one or more of actuators 18 to move probe 16 into proximity of a particular target point (or combination of points defining a datum). Once probe 16 has engaged the target point(s) (or come within a desired distance of the target point(s)), a signal (e.g., a pressure signal, an electrical signal, an optical signal, etc.) may be generated indicating the degree of engagement. Controller 20 may then calculate (for example based on known kinematics of system 10) the coordinates of a tip end of probe 16 and the corresponding coordinates of the target point(s) offset from the tip end at the time of engagement. Signals generated by probe 16 may then be used to create the dimension report described above, and a comparison of the signals relative to intended or perfect form coordinates of the same target points may be used to create the deviation report. For example, the intended form coordinates for each of the target points may be subtracted from the measured coordinates.

Controller 20 may then use the comparison information from the deviation report to determine form error, waviness, and surface roughness of component 12. In particular, controller 20 may filter the information according to a plurality of predefined wavelength ranges. For example, any deviations having a wavelength in the range of $0$-$\lambda_1$ may be considered to correspond with surface roughness; any deviations having a wavelength in the range of $\lambda_1$-$\lambda_2$ may be considered to correspond with waviness; and any deviations having a wavelength in the range of $\lambda_2$-$\lambda_3$ may be considered to correspond with errors of form. Controller 20 may filter the deviations into the three different categories (or into fewer or more categories, as desired) based on maps, equations, and/or algorithms stored in memory. Controller 20 may then create reports for each of the different categories.

Because the disclosed system may provide increased detail regarding component surface measurements, it may be easier to determine based on the detail if the component was manufactured according to associated specifications. In particular, it may be possible to determine if the component has a desired form, a desired waviness, and a desired surface roughness.

It may also be possible to determine, based on the detailed deviation reports, what action should be taken if one or more of the specifications requirements are not achieved. For example, a form error may be caused by incorrect placement of component 12 relative to processing tools, while waviness and/or roughness may have to do with a worn tool or aged processing machine.

It will be apparent to those skilled in the art that various modifications and variations can be made to the disclosed system and method without departing from the scope of the disclosure. Other embodiments of the disclosed system and method will be apparent to those skilled in the art from consideration of the specification and practice of the system and method disclosed herein. It is intended that the specification and examples be considered as exemplary only, with a true scope of the disclosure being indicated by the following claims and their equivalents.

What is claimed is:

1. A system for measuring a component, comprising:
 a probe;
 at least one actuator operably connected to the probe and configured to move the probe relative to the component; and
 a controller in communication with the probe and the at least one actuator to control the movement of the probe relative to the component based on command signals from the controller;
 the probe configured to move across and engage target points along surfaces of the component and generate signals corresponding to actual locations of the target points of the component detected by engagement of the probe with the target points;
 the controller being configured to:
  receive coordinates of intended form target points;
  receive one or more definitions of one or more component datums from an operator of the system;
  receive actual locations of the one or more component datums detected via the probe;
  determine coordinates of the actual locations of the target points of the component relative to one or more component datums based on the signals;

make a comparison of the coordinates of the intended form target points and the coordinates of the actual locations of the target points by subtracting the coordinates of the intended form target points from the coordinates of the actual locations of the target points;

generate a deviation report based on the comparison;

filter information from the deviation report according to wavelength into a plurality of deviation categories each including a range of deviation wavelengths defined by wavelength boundaries wherein the deviation categories include one or more of a form error category, a waviness category, and a roughness category; and wherein values of wavelength boundaries bounding the range of deviation wavelengths of at least one of the deviation categories are customizable by an operator of the system.

2. The system of claim 1, wherein the controller is configured to filter the information from the deviation report into three different deviation categories.

3. The system of claim 2, wherein deviations in a form error category have greater wavelengths than deviations in waviness and roughness categories.

4. The system of claim 3, wherein deviations in the waviness category have greater wavelengths than deviations in the roughness category.

5. A system for measuring a component, comprising:

a probe;

at least one actuator operably connected to the probe and configured to move the probe relative to the component; and a controller in communication with the probe and the at least one actuator to control the movement of the probe relative to the component based on command signals from the controller;

the probe configured to move across and engage target points along surfaces of the component and generate signals corresponding to actual locations of the target points of the component detected by engagement of the probe with the target points;

the controller being configured to:

receive coordinates of intended form target points;

receive one or more definitions of one or more component datums from an operator of the system;

receive information regarding one or more actual locations of the one or more component datum detected via the probe;

determine coordinates of the actual locations of the target points of the component relative to at least one component datum based on the signals;

determine a difference between the coordinates of the intended form target points and the coordinates of the actual locations of the target points;

generate a deviation report based on the difference; and filter information from the deviation report according to ranges of different deviation wavelengths into a form error category, a waviness category, and a roughness category wherein each of the form error category, the waviness category, and the roughness category include a range of deviation wavelengths defined by wavelength boundaries;

wherein:

deviations in a form error category have greater wavelengths than deviations in waviness and roughness categories;

deviations in the waviness category have greater wavelengths than deviations in the roughness category; and values of wavelength boundaries bounding the range of deviation wavelengths of the form error category and the waviness category are customizable by an operator of the system.

6. A method of measuring a component, comprising:

moving a probe across a surface of the component to engage target points along the surface of the component;

receiving from an operator information regarding definition of at least one component datum;

detecting actual locations of the at least one component datum;

measuring actual locations of the target points relative to the at least one component datum;

receiving perfect form locations of the target points;

making a comparison of the actual locations and the perfect form locations, wherein making the comparison includes subtracting coordinates of the perfect form locations of the target points from the actual locations of the target points;

generating a deviation report based on the comparison;

receiving from an operator a desired value for a threshold wavelength of at least one of a plurality of deviation categories; and filtering information from the deviation report according to wavelength into the plurality of deviation categories, wherein the plurality of deviation categories include a form error category and a waviness category.

7. The method of claim 6, wherein the different deviation categories further include a roughness category.

8. The method of claim 7, wherein deviations in the form error category have greater wavelengths than deviations in the waviness and roughness categories.

9. The method of claim 8, wherein deviations in the waviness category have greater wavelengths than deviations in the roughness category.

* * * * *